(12) United States Patent
Blackman et al.

(10) Patent No.: US 7,836,440 B2
(45) Date of Patent: Nov. 16, 2010

(54) DEPENDENCY-BASED GROUPING TO ESTABLISH CLASS IDENTITY

(75) Inventors: Timothy J. Blackman, Arlington, MA (US); James H. Waldo, Dracut, MA (US)

(73) Assignee: Oracle America, Inc., Redwood City, CA (US)

( * ) Notice: Subject to any disclaimer, the term of this patent is extended or adjusted under 35 U.S.C. 154(b) by 1238 days.

(21) Appl. No.: 11/412,648

(22) Filed: Apr. 27, 2006

(65) Prior Publication Data

US 2007/0256069 A1 Nov. 1, 2007

(51) Int. Cl.
G06F 9/44 (2006.01)
(52) U.S. Cl. .................. 717/166; 717/170; 717/122; 717/178; 717/165; 707/695
(58) Field of Classification Search ......... 717/105–108, 717/116, 139, 147, 165–166, 174, 170, 122, 717/178; 719/316, 332, 328; 707/695
See application file for complete search history.

(56) References Cited

U.S. PATENT DOCUMENTS

| | | | | |
|---|---|---|---|---|
| 5,493,681 A | * | 2/1996 | Badger et al. ............... | 717/107 |
| 5,581,760 A | * | 12/1996 | Atkinson et al. ............ | 717/108 |
| 5,950,008 A | * | 9/1999 | van Hoff .................... | 717/139 |
| 6,138,269 A | * | 10/2000 | Ball et al. ................... | 717/108 |
| 6,345,382 B1 | * | 2/2002 | Hughes ...................... | 717/100 |
| 6,601,233 B1 | * | 7/2003 | Underwood ................ | 717/102 |
| 6,658,421 B1 | * | 12/2003 | Seshadri ..................... | 707/100 |
| 6,789,254 B2 | * | 9/2004 | Broussard ................... | 717/147 |
| 6,910,128 B1 | * | 6/2005 | Skibbie et al. .............. | 713/170 |
| 7,130,863 B2 | * | 10/2006 | Diab .......................... | 707/103 R |
| 7,152,223 B1 | * | 12/2006 | Brumme et al. ............. | 717/116 |
| 7,191,196 B2 | * | 3/2007 | Perks et al. ................. | 1/1 |
| 7,293,254 B2 | * | 11/2007 | Bloesch et al. ............. | 717/108 |
| 7,359,935 B1 | * | 4/2008 | Karipides et al. .......... | 709/203 |
| 7,487,395 B2 | * | 2/2009 | van Ingen et al. .......... | 714/16 |
| 7,502,961 B2 | * | 3/2009 | van Ingen et al. .......... | 714/21 |
| 7,523,348 B2 | * | 4/2009 | Anand et al. ............... | 714/16 |
| 7,536,679 B1 | * | 5/2009 | O'Connell et al. ......... | 717/126 |
| 7,574,459 B2 | * | 8/2009 | Sen et al. .................... | 1/1 |

(Continued)

OTHER PUBLICATIONS

Title: An adaptive hash join algorithm on a network of workstations, author: Imasaki, K et al, source: IEEE, dated: Aug. 5, 2002.*

(Continued)

*Primary Examiner*—Chameli C Das
(74) *Attorney, Agent, or Firm*—Robert C. Kowert; Meyertons, Hood, Kivlin, Kowert & Goetzel, P.C.

(57) ABSTRACT

A method for using dependency-based grouping to establish class identity comprises categorizing a plurality of classes into a set of class groups based at least in part on one or more dependencies between the classes, and generating metadata to be use for loading the classes, where the metadata includes a mapping between the set of class groups and the plurality of classes. The metadata may also include respective signatures for class groups and/or the individual classes. The method may also include validating, using at least a portion of the metadata, the identity of a particular version of a class of the plurality of classes, prior to loading the version for execution.

20 Claims, 7 Drawing Sheets

U.S. PATENT DOCUMENTS

| | | | | |
|---|---|---|---|---|
| 7,631,194 | B2* | 12/2009 | Wahlert et al. | 713/189 |
| 7,665,075 | B1* | 2/2010 | Daynes et al. | 717/148 |
| 2003/0005169 | A1* | 1/2003 | Perks et al. | 709/315 |
| 2003/0163608 | A1* | 8/2003 | Tiwary et al. | 710/1 |
| 2004/0010774 | A1* | 1/2004 | Blais et al. | 717/116 |
| 2004/0025142 | A1* | 2/2004 | Mandal et al. | 717/104 |
| 2004/0040029 | A1* | 2/2004 | Debbabi et al. | 719/315 |
| 2004/0055005 | A1* | 3/2004 | Creswell et al. | 719/315 |
| 2005/0066306 | A1* | 3/2005 | Diab | 717/108 |
| 2005/0071805 | A1* | 3/2005 | Lauterbach et al. | 717/104 |
| 2005/0216885 | A1* | 9/2005 | Ireland | 717/108 |
| 2006/0053088 | A1* | 3/2006 | Ali et al. | 707/1 |
| 2006/0064667 | A1* | 3/2006 | Freitas | 717/104 |
| 2006/0123067 | A1* | 6/2006 | Ghattu et al. | 707/203 |
| 2006/0225053 | A1* | 10/2006 | Lakshman et al. | 717/140 |
| 2007/0038890 | A1* | 2/2007 | El Far et al. | 714/25 |

OTHER PUBLICATIONS

Sewell, et al. "Acute: High-Level Programming Language Design for Distributed Computation: Design Rationale and Language Definition," University of Cambridge, Oct. 2004, No. 605, 43 pages.

Warres, "Class Loading Issues in Java™ RMI and Jini™ Network Technology," Sun Microsystems, Jan. 2006, 31 pages.

Riggs, et al., "Pickling State in the Java System," Usenix, 1996, pp. 241-250.

Leifer, et al., "Global Abstraction-Safe Marshalling with Hash Types," ACM 2003, pp. 87-98.

Sewell, "Modules, Abstract Types, and Distributed Versioning," ACM 2001, pp. 236-247.

Misha Dmitriev, "Class and Data Evolution Support in the Pjama Persistent Platform," Technical Report TR 2000-57, Jun. 2000, 67 pages.

"DLL Hell", Sun Microsystems, Inc., From Wikipedia, the free encyclopedia, Mar. 9, 2006, 3 pages.

Daynes, et al., "Sharing the Runtime Representation of Classes Across Class Loaders," Sun Microsystems Laboratories, 24 pages.

* cited by examiner

DEPENDENCY-BASED GROUPING TO ESTABLISH CLASS IDENTITY

BACKGROUND OF THE INVENTION

1. Field of the Invention

The present invention is directed to computer systems. More particularly, it is directed to determining the identity of executable objects at run time in computer systems.

2. Description of the Related Art

Many modern programming languages, such as Java™, provide a simple way to establish the identity of different programming language constructs at compile time: in the source code of a Java™ program, for example, two classes are identical if they have the same name, and differ if they have different names. However, the problem of establishing identity may be somewhat more complicated at run time. Several computing platforms, such as various versions of the Java™ platform, enable processes to load application and system code at run time from a variety of sources, such as a local file system, a remote web server, or an in-memory buffer. More than one class with the same name, potentially with significantly different behaviors, may be present in the different sources: for example, two versions of a given Java™ class may be available, one locally and one at a remote source.

In order to distinguish between different classes with the same name at run time, class loaders may sometimes be used as name space indicators for the classes. In Java™ run time environments, for example, a class loader is responsible for mapping a class name (e.g., a string) to a loaded class object. A Java™ class loader is itself an instance of a class, which is a subclass of the abstract java.lang.ClassLoader class, that provides a method such as loadClass allowing callers to request loading of named classes. The identity of the loaded class at run time in such environments is based on the tuple [class name, defining class loader]: that is, for two classes to be identical, both must have the same class name and both must have the same defining class loader. The "defining" class loader of a Java™ class is the particular class loader that passes the definition of a currently-unloaded class to the Java™ Virtual Machine (JVM) for processing, receives an initialized class object from the JVM and returns the class object to the requester. It is noted that the terms "JVM", "virtual machine process", "virtual machine" and "process" may be used synonymously herein to indicate execution environments at which applications comprising dynamically loadable classes are executed.

Questions of class identity are particularly relevant in distributed programs, for example programs that use Java™ Remote Method Invocation (RMI) or the Jini™ networking technology (subsequently referred to herein as "Jini"). Such distributed programs may rely on passing objects between processes, where the executable code for a transmitted object may not be preinstalled at the destination. Individual processes at the different nodes of a distributed programming environment may have access to different versions of the class for the same object, which may potentially lead to errors and failures that are hard to diagnose and resolve. Consider an example scenario in which a first process "P1" sends an object "obj-1", which is an instance of a class "C", to a second process "P2", intending that a version "v1" of class "C" be executed for object "obj-1" at process "P2". The run-time environment in use in the scenario may not, however, require that "P2" execute any specific version of class "C". If process "P2" has access to a locally available version "v2" of class "C", it may execute the locally available version, which may perform different computations than were expected by process "P1", potentially resulting in errors in the distributed computation being performed by "P1" and "P2". Since neither "P1" nor "P2" does anything in this scenario that violates any rules, the error introduced by the naming ambiguity of different class versions corresponding to "obj-1" may be hard to detect, and therefore hard to fix. Disambiguating between classes with the same name may thus be even more important in distributed programming environments.

A number of different approaches have been used for establishing class identities at run time. In the standard implementation of Java™ RMI, for example, the class loader used to download and define a class is determined by the location or "codebase" from which the class is downloaded. A process that sends a class to another process is responsible for also sending a "codebase annotation" (e.g., one or more Uniform Resource Locators (URLs) from which a class is to be downloaded) for the class to the receiving process. If different codebases implement different versions of the same class, this approach will disambiguate between the versions, since each version will have a different defining class loader. Unfortunately, however, if different codebases implement identical versions of a given class, this approach will still treat the versions as distinct, which may contribute to one or more of a number of problems. Such problems include, for example, potential loss of codebase annotation when objects are relayed from one process to another in distributed applications, unexpected type conflicts when codebase changes occur (e.g., when a hostname or port corresponding to a codebase changes), unnecessary memory usage caused by loading multiple identical versions of the same class at a single process, etc.

Several enhancements to the standard codebase approach have been proposed. In a technique called "preferred classes", downloaded applications explicitly specify that a subset of their classes should not be shared with the local platform, thus avoiding some of the confusion possible in the standard codebase approach. However, this technique requires that a decision be made in advance of application deployment as to which classes should be shared and which classes should be kept separate, independent of whether locally available classes are compatible with the downloaded application. Such a technique leaves open the possibility that unexpected versions of classes available locally are used, and that applications may fail to share locally-available classes compatible with downloaded code. Other approaches, such as a technique called "content-addressable codebases", may be sensitive to how classes are packaged within codebases. If two downloaded objects have some classes in common, but use codebases that contain different additional classes, then the content-addressable codebase approach fails to treat the common classes as identical. Traditional techniques for class loading (and therefore, for class identity disambiguation) are often problematic at least partly because they rely in some form on the location of class definitions or the specific contents at each location.

SUMMARY

Various embodiments of methods and systems for using dependency-based grouping to establish class identity are disclosed. According to one embodiment, a method comprises categorizing a plurality of classes into a set of class groups based at least in part on one or more dependencies between the classes (e.g., references from one class to another), and generating metadata to be used for loading the classes, where the metadata includes a mapping between the set of class groups and the plurality of classes. The metadata may also include a variety of signatures or digest values in various embodiments: for example, a respective group signature for each class group may be included, which may in turn be derived from class signatures computed for each class of the class group, as well as from group signatures of other class groups referenced by the classes included in the class group. The method may also include validating, using at least a portion of the metadata, the identity of a particular version of a class of the plurality of classes, prior to loading the version for execution. In one embodiment, a respective class loader may be identified to load the classes of each class group: e.g., if the plurality of classes of an application is categorized into a set of four class groups, a total of four class loaders may be created for the application at each execution environment where the application is executed, with each class loader responsible for loading the classes of a corresponding class group. The class loader for a particular class group may use a signature included in the metadata to verify the identity of a particular executable version of a class included in the particular class group, e.g., by comparing the signature in the metadata with a signature derived from the particular executable version. Since class identity verification using the method is based on metadata derived from the behavior of the classes themselves, rather than on external factors (such as the location where executable code for the classes may be obtained, or developer-supplied hints or directives), some of the problems experienced with traditional class identity verification mechanisms that are caused by reliance on such external factors may be avoided.

In one embodiment, the method may include analyzing executable versions of the plurality of classes to identify dependencies between the classes. In an embodiment where the metadata comprises class signatures for each class, the class signature for a particular class may be obtained by providing a representation of the executable version (e.g., byte codes) of the class as input to a mathematical function such as a hash function with a desired set of mathematical properties, and using an output of the mathematical function as the class signature. Signatures for class groups may be obtained using similar mathematical functions in some embodiments, where the class signatures for the classes contained in the class group (and the group signatures for referenced groups) may be used as inputs for the mathematical function. In some embodiments, the categorization of the classes into groups may take into consideration the packages to which the classes belong: e.g., all the classes of a given package may be placed into a single group. The process of categorizing classes may include merging groups that are involved in circular dependencies in some embodiments.

In one embodiment, a system comprises one or more processors and memory coupled to the processors. The memory comprises program instructions executable by the processors to categorize a plurality of classes into a set of class groups based at least in part on one or more dependencies between a class and another class of the plurality of classes. The instructions may be further executable to generate metadata to be used in loading one or more classes of the plurality of classes for execution, wherein the metadata includes a mapping between the set of class groups and the plurality of classes. The instructions may also be executable to generate respective group signatures for the class groups and/or respective class signatures for the classes included in the class groups in various embodiments.

In another embodiment, a system also comprises one or more processors and memory coupled to the processors. The memory comprises program instructions executable by the processors to receive metadata associated with a plurality of classes, wherein the metadata includes a mapping indicative of a categorization of the plurality of classes into a set of class groups based at least in part on one or more dependencies between a class and another class of the plurality of classes. The metadata may also include respective group signatures corresponding to the class groups and/or respective class signatures corresponding to the plurality of classes in some embodiments. The program instructions are further executable to validate an identity of a version of a given class of the plurality of classes using at least a portion of the metadata, prior to loading the version for execution.

DETAILED DESCRIPTION OF EMBODIMENTS

Figure 1:
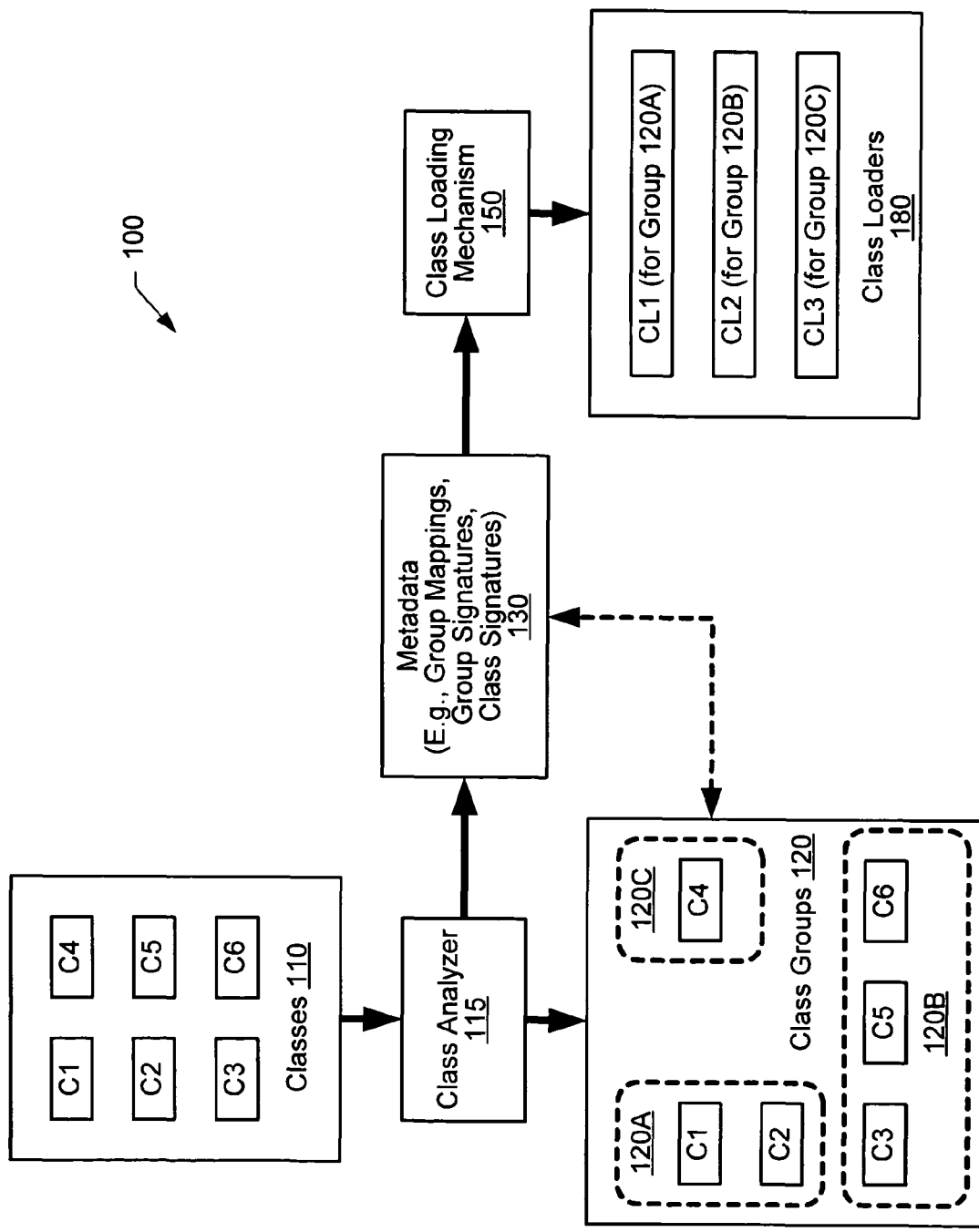
FIG. 1 is a block diagram illustrating one embodiment of a system.

FIG. 1 is a block diagram illustrating one embodiment of a system 100. The system includes a class analyzer 115 and a class loading mechanism 150. The class analyzer 115 is configured to categorize a plurality of classes 110 (e.g., classes C1-C6 in the illustrated scenario) of one or more applications into a set of class groups 120 (e.g., class groups 120A-120C), based at least in part on dependency relationships between the classes 110. For example, the class analyzer 115 may be configured to place a set of classes C3, C5 and C6 into a particular class group 120B because each class of the set references or invokes each other class in the group, either directly or indirectly. Various other factors, such as the "packages" within a source code hierarchy to which the classes belong, may also be used in the categorization of the classes into class groups in some embodiments. The process of categorization may be iterative, e.g., to take into account circular dependencies between groups in some embodiments, as described below in further detail.

The class analyzer may be further configured to generate metadata 130 to be used in loading the classes 110. The metadata 130 may be provided to the class loading mechanism 150, e.g., when an application including the classes 110 is to be executed. Prior to loading a given class 110, the class loading mechanism 150 may be configured to validate an identity of the class using the metadata 130. In one embodiment, for example, the metadata may include a mapping between the classes 110 and the class groups 120 (i.e., information identifying the class groups 120 and indicating which classes belong to each class group 120) to be used in the process of validating class identity. The metadata may also include signatures or digest values for each of the classes 110. The terms "signature" and "digest" of an entity may be used synonymously herein to refer to the result of a mathematical function (such as a hash function selected for specific mathematical properties) applied to the entity, such that the result for a given entity has a high probability of being different from the result for any other entity. Depending on the specific mathematical function chosen, the probability of the signature for a given class 110 being different from the signature for another class 110 may be so high that the signature may serve effectively as a unique identifier for the class. In some embodiments, the class loading mechanism 150 may comprise a software program configured to use the metadata to create a set of class loaders 180 (such as class loaders CL1, CL2 and CL3) at an application deployment site such as a Java™ virtual machine, where each class loader is responsible for validating and loading classes belonging to a particular class group 120 (e.g., in the example scenario of FIG. 1, class loader CL1 corresponds to class group 120A, CL2 to class group 120B, and CL3 to class group 120C). The class loaders 180 may use class signature values included in the metadata to validate class identity. In one embodiment, the metadata may also include signatures or digest values for each of the class groups 120, and each of the class loaders 180 may be associated with or identified by the group signature for the corresponding class group 120.

The class analyzer 115 may be executed at a different execution environment than the class loading mechanism 150 in some embodiments. For example, classes 110 of an application may be analyzed and categorized into class groups 120 at a first Java™ virtual machine (JVM), and the metadata for the application's classes may be sent to a different JVM where the application is to be executed, e.g., over a network connection. Any of a variety of techniques for distributed programming, such as techniques based on Java™ RMI or Jini, may be employed in various embodiments for the execution of the application. In some embodiments, the metadata 130 may be included or "piggybacked" within a data object that is already required for the distributed programming technique—for example, in one implementation, the metadata may be stored in a file within a well-known directory such as "META-INF" included within a Java™ Archive (JAR) file corresponding to the application.

The categorization of classes 110 into groups based on class reference behavior, the use of class and/or group signatures, and the association of a unique class loader 180 with each class group, may together result in a robust class disambiguation mechanism that does not rely on class location (e.g., as in conventional techniques based on codebases) or developer input (e.g., developer-provided hints or directives designating which classes are not to be shared with a local execution environment). The metadata 130 including the class-to-group mappings and the signatures may be relayed unchanged from one execution environment to another, resulting in the establishment of similar class loader hierarchies at each execution environment where the application is to be executed, and avoiding some of the problems of traditional distributed programming techniques, such as codebase annotation loss and unexpected type conflicts if codebase changes such as hostname changes or port changes occur.

A simple example of the operation of system 100, in one embodiment in which the Java™ programming language is employed to implement the classes 110 and in which the classes are arranged into class groups based on their parent packages as well as on their reference behavior, is provided below. (In the context of the Java™ programming language, the term "package" refers to a named collection of classes that defines a namespace for the contained classes. The package for each class is typically defined by a package directive in the source code for the class, usually in the first non-comment, non-blank line of the source code. For example, two source files that each begin with the source code line "package com.abc.xyz" indicate that each class defined in the two source files belongs to the "com.abc.xyz" package.) The source code of four classes of the simple example includes the following:

```
Source for class "Main":
package main;
public class Main {
    public static void main(String[ ] args) {
        System.out.println(new App( ));
    }
}
Source for class "App":
package main;
import main.proc.Processor;
public class App {
    App( ) { }
    public String getValue( ) {
        return "App.value";
    }
    public String toString( ) {
        return "App<" + Processor.getName(this) + ">";
    }
}
Source for class "Processor":
package main.proc;
import main.App;
import main.util.Utilities;
public class Processor {
    public static String getName(App app) {
        return Utilities.getName( ) + "=" + app.getValue( );
    }
}
Source for class "Utilities":
package main.util;
public class Utilities {
    public static String getName( ) {
        return "Utilities.key";
    }
}
```

In the example, classes Main and App belong to package main, class Processor belongs to package main.proc, and class Utilities belongs to package main.util. In one embodiment, class analyzer 115 may be configured to analyze the byte code of the classes (i.e., an executable version of each of the classes) to determine which classes refer to which other classes. For example, a class such as the publicly available com.sun.jini.tool.ClassDep class from release 2.1 of the "Jini Technology Starter Kit" available from Sun Microsystems may be used to analyze the byte code to identify class dependencies, or a program written using the Byte Code Engineering Library (BCEL) technology available as open source from the Apache Software Foundation may be employed for byte code analysis. In other embodiments, analysis may be performed on the source code of the classes instead of or in addition to analysis on byte codes.

The analysis of the classes in the example may indicate the following initial set of dependencies: (a) main.Main (i.e., class Main of package main) references main.App; (b) main.App references main.proc.Processor; (c) main proc.Processor references main.util.Utilities as well as main.App; and (d) main.util.Utilities does not reference any other class. The reference relationships among the classes may be represented graphically as follows, where an arrow leading from a given class to an other class indicates that the given class references the other class:

main.Main=>main.App<=>main.proc.Processor=>main.util.Utilities

Note that in the graphical representation, a double-pointed arrow links main.App to main.proc.Processor, since each of these two classes references the other in an example of a "circular reference" or "circular dependency". As used herein, the terms "circular reference" and "circular dependency" between two entities A and B refers to the fact that entity A depends (directly or indirectly) on entity B, and entity B depends (directly or indirectly) on entity A. To map classes to groups in the example, the class analyzer 115 first creates a group for each package, as follows:

Group G1: (main.Main, main.App)

Group G2: (main.proc.Processor)

Group G3: (main.util.Utilities)

The dependency relationships between the groups may be represented as follows, using similar notation to that used above for representing class dependencies:

G1<=>G2=>G3

Next, the class analyzer 115 may be configured to combine groups involved in circular references into a single group, leading to a new group G4 comprising the elements of G1 and G2:

Group G4: (main.Main, main.App, main.proc.Processor)

with the dependency relationships now represented as:

G4=>G3

The class analyzer may generate the metadata 130 for this simple example in the form of a file comprising the following information:

ResourceGroupSignature: 1XJ6ypD+xsiN+3QCGjv4RrBPL4w=
    Name: /main/util/Utilities.class
    Signature: nQPDDM6×85qZAWllds+BC3BL/Ic=
ResourceGroupSignature: HuEeOTG+JSOOwiP8cz9JOUwJfS0=
    Name: /main/App.class
    Signature: uWXWcJqO83R2ndon5Lb1U49KFjQ=
    Name: /main/Main.class
    Signature: jxXvraf53EGvIo7SXnByXqgTt/M=
    Name: /main/proc/Processor.class
    Signature: xZDGAufcxXwnZvXBq0rIZo5t2wE=
    ReferencedGroupSignature: 1XJ6ypD+xsiN+3QCGjv4RrBPL4w=

In the exemplary metadata 130, each ResourceGroupSignature line introduces a new class group, named using an encoding (e.g., a Base64 encoding in which binary data is represented as ASCII characters) of the signature of the group, while the signature of the group is derived from the signatures of the classes contained in the group and the signatures of the groups referenced by the group. Each Name entry in the metadata 130 names a class in the group, followed by the signature of the class, which may for example be computed as a hash value from the byte code of the class. Each ReferencedGroupSignature line specifies another group referenced by the current group, where the referenced group is identified by its signature. Since there are four classes and two groups (G4 and G3) in this example, there are four Name entries and two ResourceGroupSignature entries in the metadata. The first ResourceGroupSignature entry in the metadata corresponds to group G3, and the second ResourceGroupSignature entry corresponds to group G4; and since group G4 depends on group G3, the section of the metadata that corresponds to G4 includes a ReferencedGroupSignature entry identifying G3.

The order in which entries for various class groups 120 is stored in the metadata 130, and the format in which the metadata is stored and/or transmitted to class loading mechanism 150, may vary in different embodiments. As shown in the example above, in some embodiments, entries for "leaf" class groups (class groups that do not depend on other class groups) may be computed and placed first in the metadata 130, and entries for other class groups may be computed and placed later in the metadata 130, e.g., in a depth-first traversal of a dependency graph between class groups. In other embodiments, the metadata may be arranged according to an ordering that does not correspond to a depth-first traversal of the group dependency graph.

When metadata 130 shown above is received for the first time at a class loading mechanism 150 (e.g., in response to a request to load a specific class 110, where the request also specifies a URL from which the class files for the class may be obtained), the class loading mechanism may be configured to create a respective class loader 180 for each class group 120 identified in the metadata 130 in some embodiments. The class group 120 associated with a given class loader 180 (i.e., the class group 120 for which the class loader 180 is created by class loading mechanism 150) may be termed the "primary" group for the class loader herein. In some embodiments, the class loaders may be created in depth-first order based on the reference graph of the class groups 120. In the example scenario whose metadata is shown above, two class loaders may be created, one whose primary group is G3 and one whose primary group is G4. In some embodiments, each class loader 180 may be configured to record its own signature, e.g., derived from the signature of its primary group, the signatures of the individual classes 110 of the primary group, and/or the signatures of the other class groups referenced by the classes of the primary group. The recorded class loader signatures may be used, for example, by the class loading mechanism 150 to ensure that the appropriate class loader is invoked for any future class loading request. The class loader 180 may also be configured to retain, e.g., in a persistent database, some or all of the information included in the metadata associated with its primary group for use during future class loading requests. In one embodiment, for example, the class loader may be configured to store a mapping between the names of classes included in the primary group and their respective signature values, as well as the signature values for groups referenced from the primary group.

In response to a request to load a particular class 110 (e.g., main.Main in the above example), the particular class loader 180 whose primary group (e.g., group G4 in the example) includes the class may be configured to download a class file corresponding to the class 110 from a specified URL and generate a signature for the downloaded class. The identity of the downloaded class may be validated by checking whether the signature of the downloaded class matches the signature in the metadata. If the signatures match, the class may be loaded. If the signatures do not match, the class loader may generate an error indication in some embodiments. If the downloaded class references classes that are not in the primary class group, class loaders for the referenced classes may be identified (e.g., using the ReferencedGroupSignature entries in the exemplary metadata 130 described above, or using corresponding information stored in the class loader's database). For example, since main.Proc.Processor references main.Utilities in the above example, a request to load main.proc.Processor, handled by a class loader created for G4, may also lead to an invocation of a class loader for G3 to handle the loading of the referenced class main.Utilities. After a set class loaders 180 have been created for a given set of class groups 120, subsequent class loading requests for classes 110 belonging to those class groups may be handled by re-using the class loaders.

Figure 2:
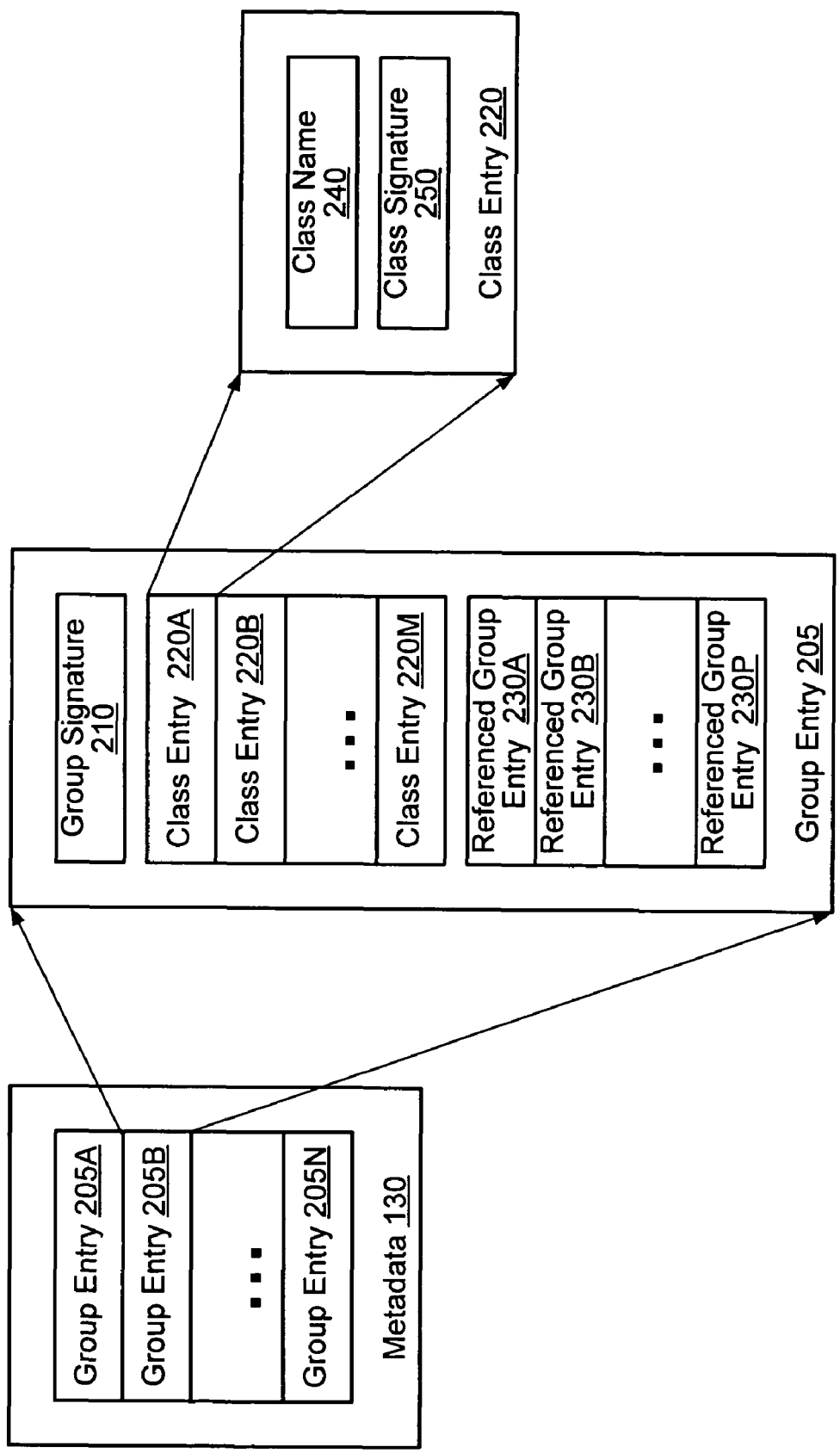
FIG. 2 illustrates an exemplary template for organizing metadata to be used to load classes, according to one embodiment.

As noted above, the metadata 130 may be generated and/or stored by class analyzer 115 in a variety of different formats in various embodiments. FIG. 2 illustrates an exemplary template for organizing metadata 130, according to one embodiment. The exemplary metadata described above for groups G3 and G4, for example, may be generated by a class analyzer 115 configured to use the template illustrated in FIG. 2. As shown, the metadata 130 may comprise a plurality of group entries 205 (e.g., 205A-205N). Each group entry 205 may comprise information for a particular class group 120, including, for example a group signature 210 and a collection of class entries 220 (e.g., 220A-220M). If the class group is not a leaf group (i.e., if classes that are not included in the class group are referenced from the class group) the class group entry 205 may include a collection of referenced group entries 230A-230P. Each class entry 220 may in turn include a class name 240 and a class signature 250. In some embodiments, the ordering of group entries 205 within the metadata 130 may be based on a traversal order of a dependency graph: e.g., the class analyzer 115 may be configured to generate a graph representing dependencies between various class groups 120, and the group entries 205 may be arranged in depth-first order or breadth-first order with respect to the graph. In other embodiments, the group entries 205 may be arranged within the metadata 130 based on other ordering criteria—e.g., based on a numerical order of the corresponding signature values. In some embodiments, class entries 220 within a given group entry 205 may be arranged in lexical order (e.g., alphabetically based on class name), and referenced group entries 230 within the given group entry 205 may be arranged in numerical order of their signatures. In some implementations, the metadata 130 may include names for the class groups and the referenced groups, e.g., to ease debugging, both names and signature values for class groups and referenced groups may be stored. In one implementation, additional information may be included in the metadata, such as a URL for obtaining executable class files, an indication of the specific mathematical function or functions used for generating signatures, security information, etc. Part or all of the metadata 130 may be encrypted in some embodiments before it is transmitted to a class loading mechanism 150.

Figure 3:
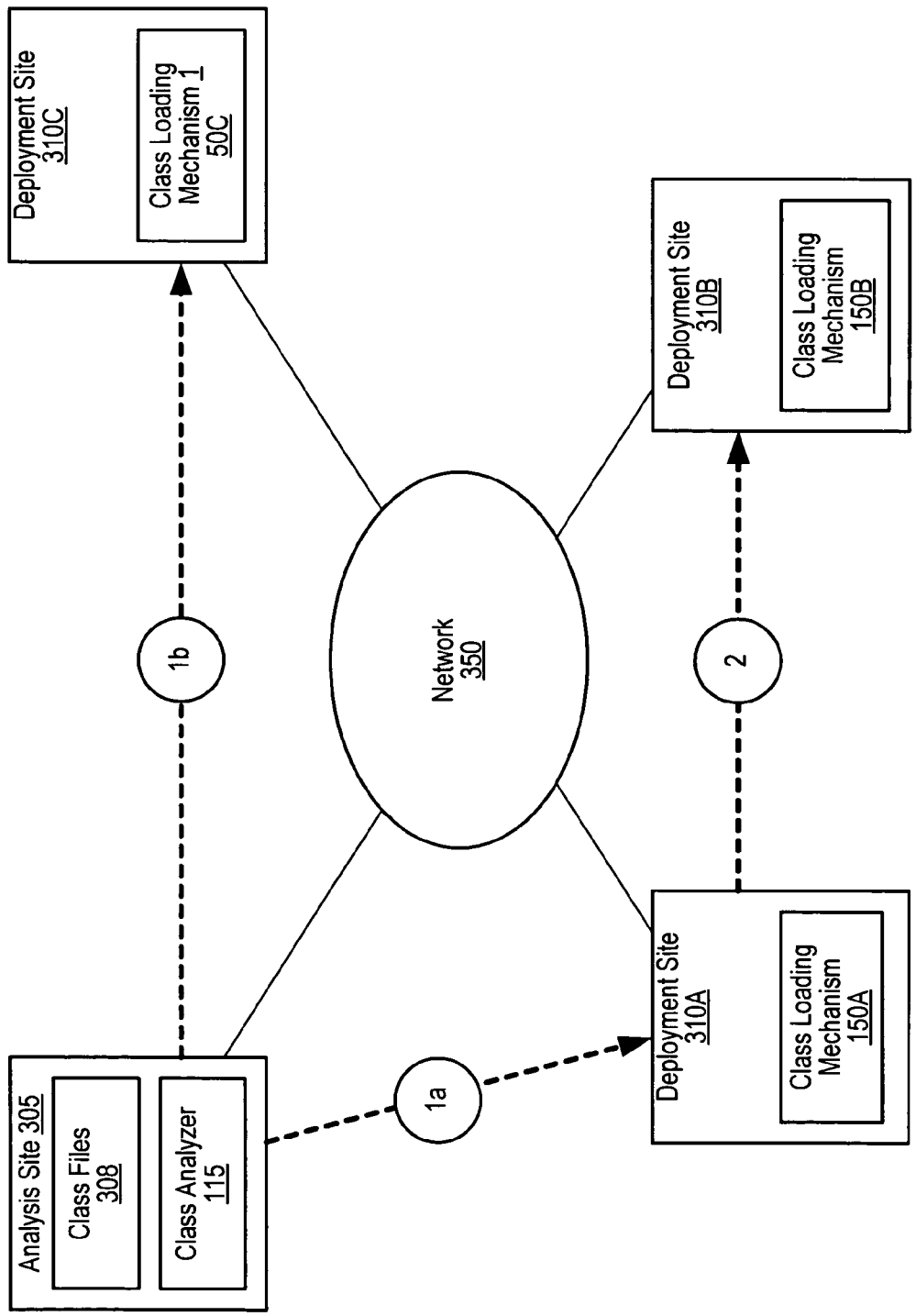
FIG. 3 is a block diagram illustrating an embodiment in which a class analyzer runs at an analysis site that is linked via a network to a plurality of deployment sites at which classes are to be loaded for execution.

In some embodiments, the class analyzer 115 and the class loading mechanism 150 may be used during local execution of applications—i.e., in some scenarios, the classes 110 may be analyzed, and the metadata 130 generated, at the same execution environment or JVM at which the classes are to be loaded and executed. In other embodiments, the techniques described above may be used with distributed programming techniques such as Jini or RMI, and the metadata 130 may be relayed from one execution environment to another according to the needs of one or more distributed applications. FIG. 3 is a block diagram illustrating one embodiment in which the class analyzer 115 runs at an analysis site 305 that is linked via a network 350 to a plurality of deployment sites 310 (e.g., 310A-310C) at which classes 110 are to be loaded for execution. The network 350 may comprise any combination of wired and/or wireless local area networks (LANs), metropolitan area networks (MANs), and wide area networks (WANs) (including, for example, a portion of the Internet) in various embodiments. In some embodiments, each site shown in FIG. 3 may correspond to a different physical location, and each site may include one or more execution environments or JVMs. In the depicted embodiment, executable versions of the classes 110 (e.g., class files 308 comprising byte codes for the classes) may be stored at the analysis site as well, and a URL for the analysis site may be provided to allow class loaders 180 at the deployment sites 310 to download the executable versions as needed. In other embodiments, executable versions of the classes may be stored at a different site than the site where the class analyzer 115 executes, or may be replicated at a plurality of locations.

In one embodiment, the metadata 130 for the classes of one or more applications may be initially transmitted from the analysis site 305 to a plurality of deployment sites 310, such as 310A and 310C, as indicated by the arrows labeled "1a" and "1b" in FIG. 3. The initial transmission of the metadata 130 may occur prior to the time at which any of the classes have to be loaded or executed in some embodiments; e.g., the metadata may be distributed to a collection of deployment sites 310 in preparation for future class loading requests. In response to receiving the metadata 130, class loading mechanisms 150 at each receiving site may create respective class loaders 180 for each of the class groups 120 identified in the metadata. During the execution of a distributed application, the metadata 130 may be sent from one deployment site to another—e.g., if a method referencing a class is invoked remotely from deployment site 310A at deployment site 310B, metadata corresponding to the class may be transmitted over network from site 310A to site 310B, as indicated by the arrow labeled "2" in FIG. 3. It is noted that once metadata 130 is generated for a given set of classes 110 in the embodiment shown in FIG. 3, the metadata may not be changed as it is transmitted from one site to another. Thus, even though the various deployment sites 310 may differ in various respects, such as in the sets of executable classes each site may have cached locally, in the details of the local programming environments such as compiler versions, etc., the fact that the metadata 130 for a given set of classes 110 remains unchanged across the deployment sites may help to ensure that an identical hierarchy of class loaders is set up at each site for the classes, and that the identity of each class can be unambiguously validated prior to loading at any of the sites.

In embodiments such as those described above, where the metadata 130 is derived from the content (e.g., the byte code) and referencing behavior of the classes 110, a change in the content of a class may automatically result in invalidating the existing metadata and may require new metadata to be generated. In turn, the new metadata may lead to a different set of class loaders 180 being created at various deployment sites 310. In such embodiments, the same class loader 180 may not be used to load the two different versions of the class. As a result, in execution environments such as JVMs where the identity of a class is determined by the tuple [class name, defining class loader], each version of the class may be provided a different, unique identity.

Figure 4:
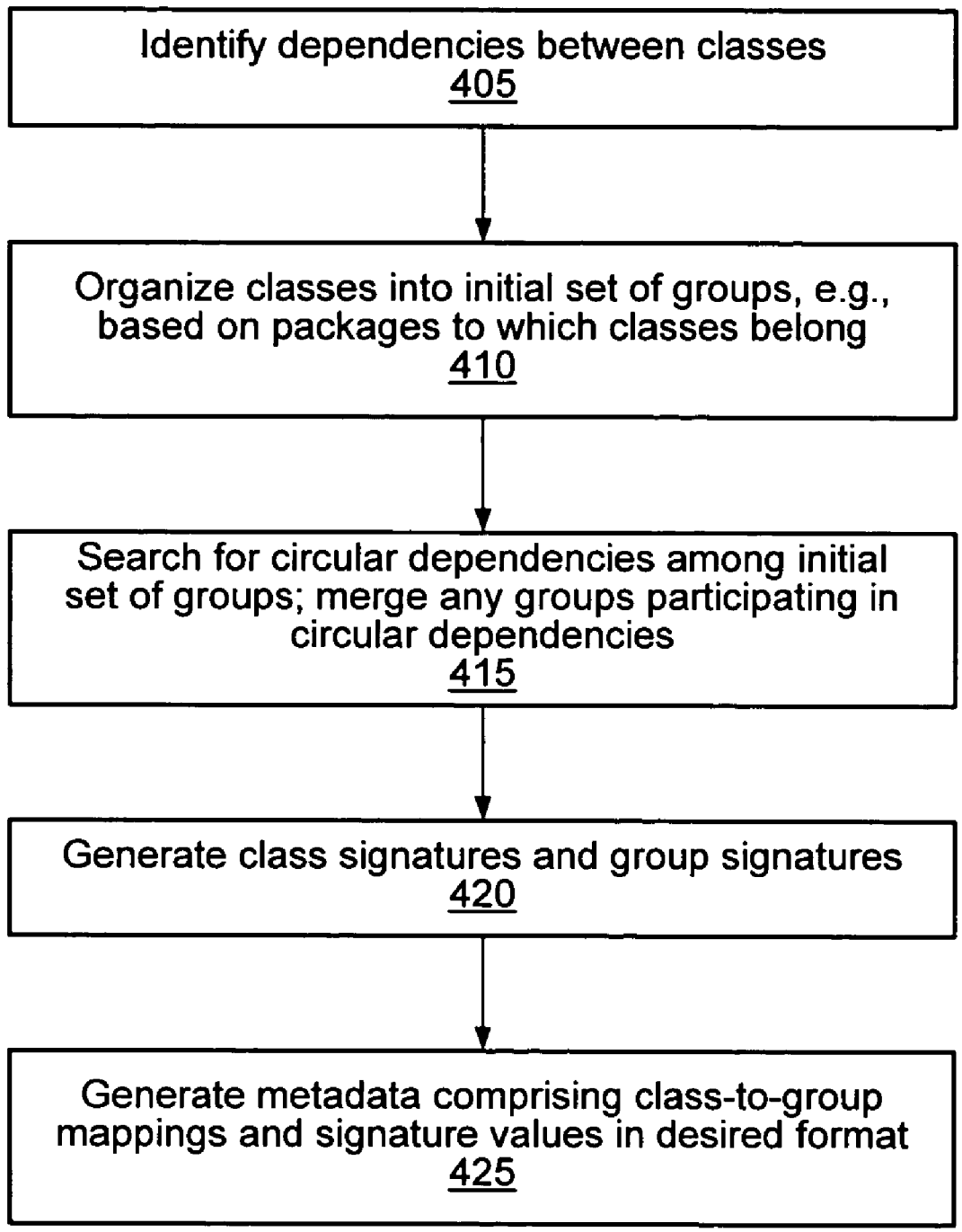
FIG. 4 is a flow diagram illustrating aspects of the operation of a class analyzer, according to one embodiment.

FIG. 4 is a flow diagram illustrating aspects of the operation of the class analyzer 115, according to one embodiment. The class analyzer 115 may be provided a set of classes 110, and may be configured to identify dependencies between the classes (block 405 of FIG. 4). Any of a number of different techniques may be employed to identify the dependencies in various embodiments. For example, as noted earlier, in one embodiment where the Java™ programming language is employed, byte code corresponding to the classes may be analyzed using a tool obtained from a version of the "Jini Technology Starter Kit" available from Sun Microsystems, or using a program written using the Byte Code Engineering Library (BCEL) available from the Apache Software Foundation. Other tools may be employed for different programming languages. In some embodiments where source code for the classes is accessible, the source code may be analyzed to identify the dependencies.

In the embodiment illustrated in FIG. 4, the classes 110 may be categorized into an initial set of class groups 250 based, for example, on the packages to which the classes belong (block 410 of FIG. 4): e.g., one class group 250 may be set up for each package. The information on inter-class dependencies generated in operations corresponding to block 405 may be used to determine inter-group dependencies: e.g., if a class A in a group G1 references a class B in group G2, G1 may be identified as being dependent on G2. It is noted that in embodiments where classes belonging to a particular package can be loaded by different class loaders, categorization based on packages may not be required, and the initial categorization corresponding to block 410 may be based simply on an initial set of identified dependencies. After the initial set of class groups 250 and corresponding group dependencies have been identified, class analyzer 115 may be configured to search for circular dependencies between class groups, and for every circular dependency identified, merge the class groups participating in the circular dependency (block 415). For example, if class analyzer 115 identifies three class groups G1, G2 and G3 during initial categorization, of which G1 depends on G2 and G2 depends on G1, G1 and G2 may be merged into a single group G4. Some circular dependencies may include more than two participating groups and may include indirect dependencies: e.g., in one exemplary scenario, G1 may depend on G2, G2 on G3, and G3 on G1, in which case G1, G2 and G3 may all be merged into a single group G4. In this example, the dependency of G1 on G2 may be termed a "direct" dependency, and the dependency of G1 on G3 may be termed an "indirect" dependency.

After circular dependencies have been processed as described above, the class analyzer 115 may be configured to begin generating signatures for the classes 110 and for the class groups 120 (block 420). The sequence in which signatures for various classes 110 and class groups 120 are computed may vary in different embodiments. In one embodiment, for example, signatures may be computed first for the individual classes 110 of leaf class groups 120 (i.e., for class groups 120 that do not depend on other class groups). Next, the group signatures of the leaf class groups 120 may be computed. A leaf class group signature computation for a given leaf class group LG may be followed by the computation of individual signatures for classes of a referencing class group RG that directly reference LG's classes, followed by the computation of RG's signature, and so on. In other embodiments, the signatures for all the individual classes 110 may be computed first, and then the signatures for class groups may be computed.

In one embodiment, a signature for individual class 110 may be obtained by providing the byte codes corresponding to the class as input to a mathematical function, and using an output value of the function as the signature. For example, a hash function that has the following characteristics may be used to generate the signature in one implementation: given two input streams that are identical, the output value is identical, and given two input streams that are not identical, the output values for the two streams have a very high probability of not being identical. In other embodiments, instead of providing the byte codes for a class as input, names or identifications of one or more interfaces of the class may be used as input to the mathematical function. In embodiments where interface names rather than byte codes are used to generate signatures, the signatures for a class may be independent of the specific compilers used to generate the byte code: for example, even if the byte code produced by a compiler C1 for a class A differs from the byte code produced by a different compiler C2 for the same source code, the signatures for the two compiled versions may not differ. Class identity disambiguation in such embodiments may therefore be compiler-independent. It is noted that computing signatures based on interface identifications (e.g., method names) may be especially useful for classes that are part of the standard packages that make up the Java™ runtime environment, since the application programming interfaces (APIs) for these classes are standardized, while the byte codes for the classes may vary from one Java™ implementation to another. In another embodiment, e.g., instead of just using interface identifications (e.g., method names) to generate a class signature, the source code of the class may be used as input to the mathematical function. Portions of the text of the source code that are not directly related to the behavior of the class may be ignored or manipulated in various implementations of source-code based signature generation techniques, e.g., in an effort to ensure that classes with identical behavior have identical signatures. For example, comments in the source code may be ignored during signature generation, sequences of one or more consecutive whitespace characters (such as blanks, tabs, new line characters etc.) may be replaced by a single canonical character, and so on.

A signature for a class group 120 may be derived from the signatures of the constituent classes 110 of that group, as well as from the signatures of any other groups referenced by the constituent classes. For example, in one embodiment where a particular hash function H is used for generating individual class signatures, a class group signature may be obtained by providing the set of class signatures of the constituent classes (e.g., arranged in lexical order according to class name), as well as the signatures of any referenced groups, as input to the same hash function H. In another embodiment, a different mathematical function may be used to generate group signatures than the mathematical function used for generating individual class signatures. It is noted that in some embodiments, e.g., where class analyzer 115 comprises a plurality of executable threads, signatures for several classes 110 and/or class groups 120 may be generated concurrently.

In the depicted embodiment, the class analyzer 115 may be configured to assemble the metadata 130 identifying class-to-group mappings (i.e., information indicating to which group each class belongs) as well as the various computed signature values in a desired format (e.g., using an organization similar to that illustrated in FIG. 2) (block 425 of FIG. 4). In some embodiments, the metadata may be pre-assembled, e.g., prior to deployment of an application or applications that include the classes 110; in other embodiments, the metadata may be assembled only in response to a request to deploy an application. Pre-assembled metadata 130 may be stored in a repository, e.g., together with the source code and/or executable versions of the classes in some embodiments. In some embodiments, an explicit representation such as a directed graph of the dependencies between class groups may be included in the metadata 130, instead of or in addition to implicit dependency information provided by listing referenced class groups for each non-leaf class group.

Figure 5:
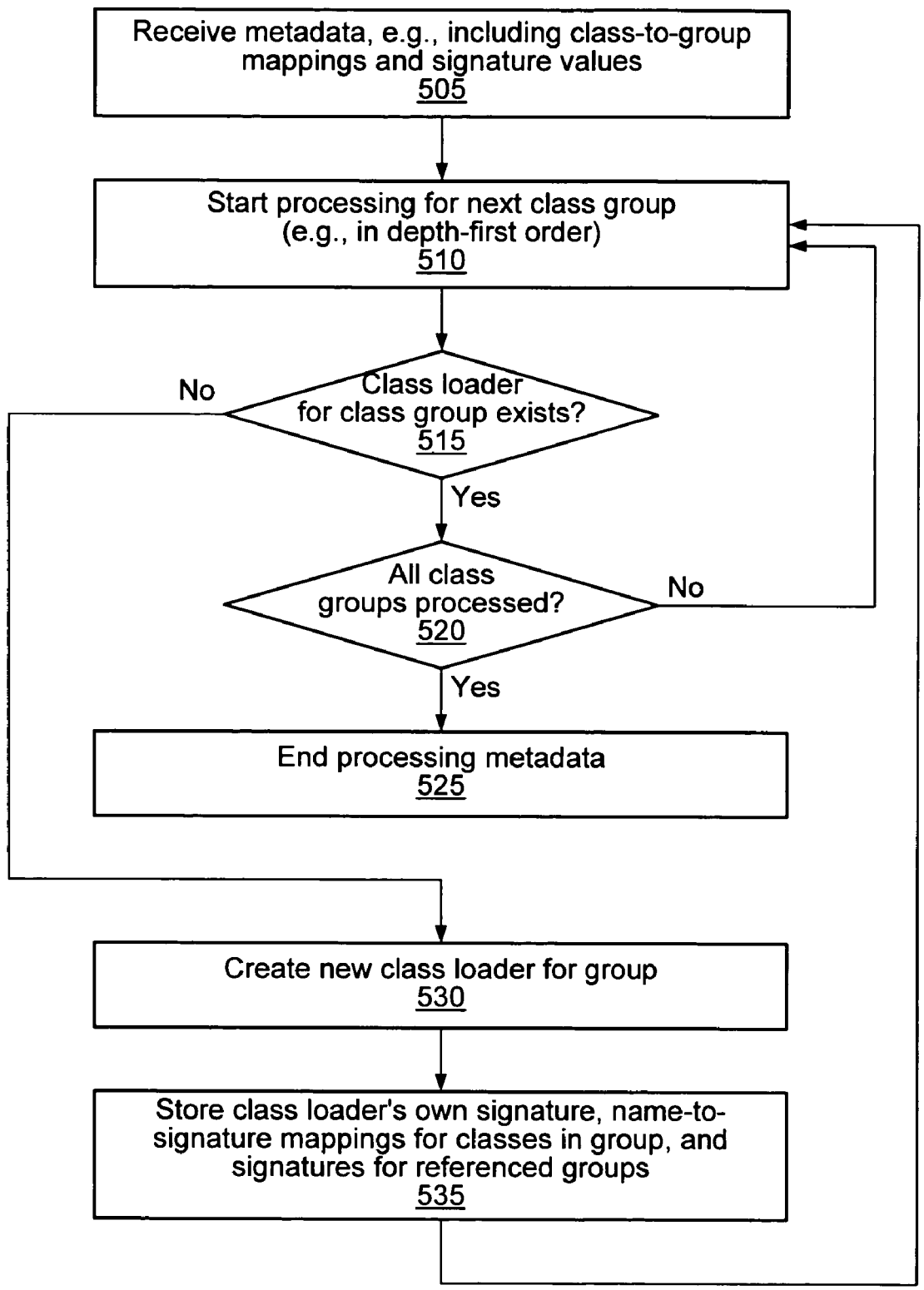
FIG. 5 is a flow diagram illustrating aspects of the operation of a class loading mechanism during the establishment of a set of class loaders corresponding to received metadata, according to one embodiment.

FIG. 5 is a flow diagram illustrating aspects of the operation of class loading mechanism 150 during the establishment of a set of class loaders corresponding to received metadata 130, according to one embodiment. The class loading mechanism 150 may receive the metadata 130 including the class-to-group mappings and the signature values (block 505). The class groups identified in the metadata may then be processed iteratively, e.g., in the order in which they are listed in the metadata 130, or in depth-first order based on a dependency graph. The class loading mechanism may start the processing for the next class group (block 510) by determining whether a class loader for the class group already exists in the local execution environment. For example, in embodiments where each class loader is configured to record its own signature, the class loading mechanism may be configured to search for a class loader 180 with a signature that corresponds to the signature of the class group being processed. In some embodiments, the class loader signature to be searched for may be derived by applying a mathematical function to the class group signature. In other embodiments where class loaders are identified simply by the signatures of the corresponding class groups, the class loading mechanism 150 may search for a class loader with a signature identical to that of the class group being processed. If an appropriate class loader for the class group is found (as detected in block 515), indicating for example that the class loading mechanism has previously processed the metadata 130, and if more class groups remain to be processed (as detected in block 520), the class loading mechanism may proceed to processing the next class group identified in the metadata (repeating the operations corresponding to blocks 510, 515 and 520). If no more class groups remain to be processed (as also detected in block 520), the processing of the metadata is complete (block 525).

If no existing class loader is found for the class group (as also detected in block 515), the class loading mechanism may be configured to create a new class loader 180 for the class group (block 530), for example by creating a new instance of a subclass of the abstract java.lang.ClassLoader class in embodiments where the Java™ programming language is used to implement the classes 110. The newly created class loader 180 may be configured to record its own signature (e.g., derived from the group signature of its primary class group 120 and/or other portions of a group entry 205 for the primary class group 120), mappings between the class names and class signatures for classes 120 of the primary class group, and signatures for other class groups referenced from the primary class group (block 535). The class loader signature may be saved in persistent storage, for example, and may be used to identify the appropriate class loader to use when a subsequent request to load a class of the primary class group is received.

Figure 6:
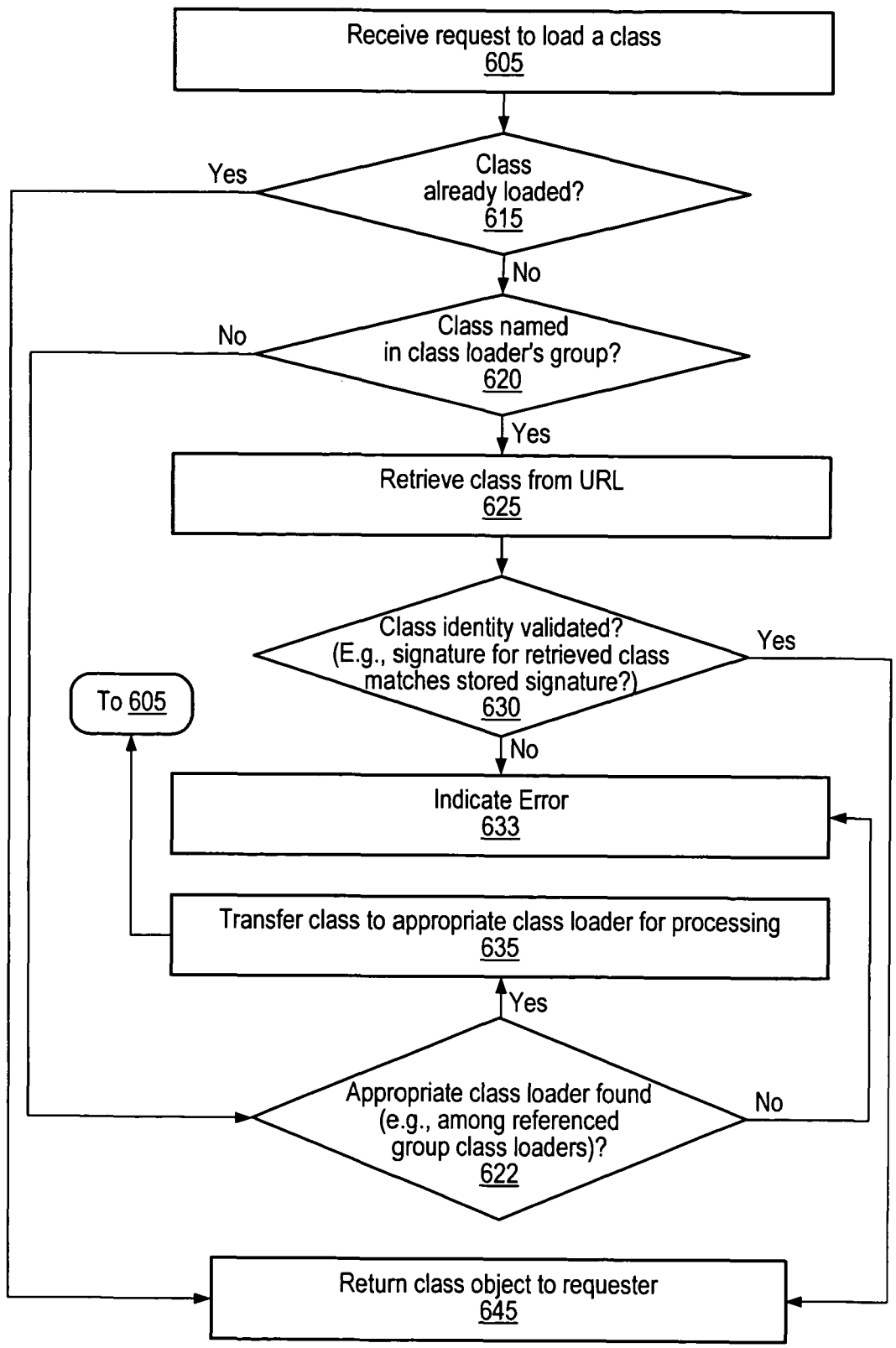
FIG. 6 is a flow diagram illustrating aspects of the operation of a class loader in response to a request to load a class, according to one embodiment.

FIG. 6 is a flow diagram illustrating aspects of the operation of a class loader 180 in response to a request to load a class 110, according to one embodiment. The class to be loaded may be either explicitly specified, e.g., as a parameter to a loadClass method or its equivalent, or may be a referenced class (e.g., a class that is referenced by the class specified as a parameter in a loadClass method). As shown in block 605 of FIG. 6, a class loader 180 may receive the request to load the class 110. In one embodiment, the request may include or be accompanied by a URL indicating a location from which executable code for the class may be accessed. In some embodiments, the request to load the class may be accompanied by the metadata 130, and the specific class loader 180 designated to respond to the request may be selected by the class loading mechanism 150 using the metadata. If the class is already loaded in the execution environment of the class loader (as determined in block 615), the class loader may return the class object to the requester (block 645). If the class is not already loaded, the class loader may be configured to verify that the class's name is included in the set of class names for the primary class group of the class loader (block 620).

In response to determining that the requested class is included in the set of class names for its primary class group, the class loader may download the class from the URL (block 625) and validate the identity of the downloaded class (block 630). For example, the class loader may check whether a signature computed from the downloaded class matches a signature indicated by the metadata 130 corresponding to the class (e.g., a signature stored earlier based on received metadata 130 in operations corresponding to block 535 of FIG. 5). If the identity of the downloaded class is validated, the class may be loaded and the class object corresponding to the class may be returned to the requester (block 645). If the identity is not validated, the class loader may generate an error message in some embodiments, indicating for example that an invalid or unexpected version of the class has been encountered (block 633).

If, in operations corresponding to block 620, the class loader determines that the class is not among the named classes of its primary class group, the class loader may infer that the class is a referenced class belonging to a different class group 120. The class loader may then be configured to identify a different class loader appropriate for the class, e.g., by searching among class loaders corresponding to referenced class groups of its primary class group. For example, in one embodiment a query interface may be supported by the class loading mechanism 150, allowing the appropriate class loader for a given class to be identified. If an appropriate class loader is found (as detected in block 622), the class may be transferred to the appropriate class loader for loading (block 635). The class loader to which the class is transferred may be configured to repeat operations corresponding to blocks 605 onwards before loading the class, as indicated by the rounded block labeled "To 605" in FIG. 6. If no appropriate class loader is found, an error may be generated (block 633).

In some embodiments, e.g., to prevent the creation of an excessive number of class loaders by class loading mechanism 150, heuristics may be used to limit the total number of class loaders generated. For example, if the class analyzer 115 determines that the number of class groups 120 for a given application exceeds a specified threshold, the class analyzer 115 may be configured to merge selected class groups until the total number falls below the threshold. It is noted that decisions about combining multiple class groups may be made in some embodiments at the deployment sites instead of or in addition to being made by the class analyzer 115, and different deployment sites may make different decisions about which class groups are to be combined in some such embodiments. In some embodiments, class groups 120 that contain only leaf classes, and/or class groups 120 that contain no more than a specified small number of classes may be merged to reduce the total number of class groups, and hence the total number of class loaders 180. Heuristics based on observed application behavior, e.g., how often classes belonging to two different class groups are executed in close time proximity, may be used to merge class groups in some embodiments: e.g., if classes in class group 120A are frequently executed at about the same time that classes in class group 120B are executed, class groups 120A and 120B may be merged.

It is noted that although several exemplary embodiments described above have dealt with classes written in the Java™ programming language and executed at JVMs, the techniques described here for grouping classes based on reference behavior and using the grouping information to verify class identity are not limited to Java™ based environments. In various embodiments, any appropriate programming language and any suitable execution environment may be used. In addition, the techniques described herein may be employed to support class disambiguation in any appropriate distributed programming techniques, in addition to RMI and Jini-based techniques.

Figure 7:
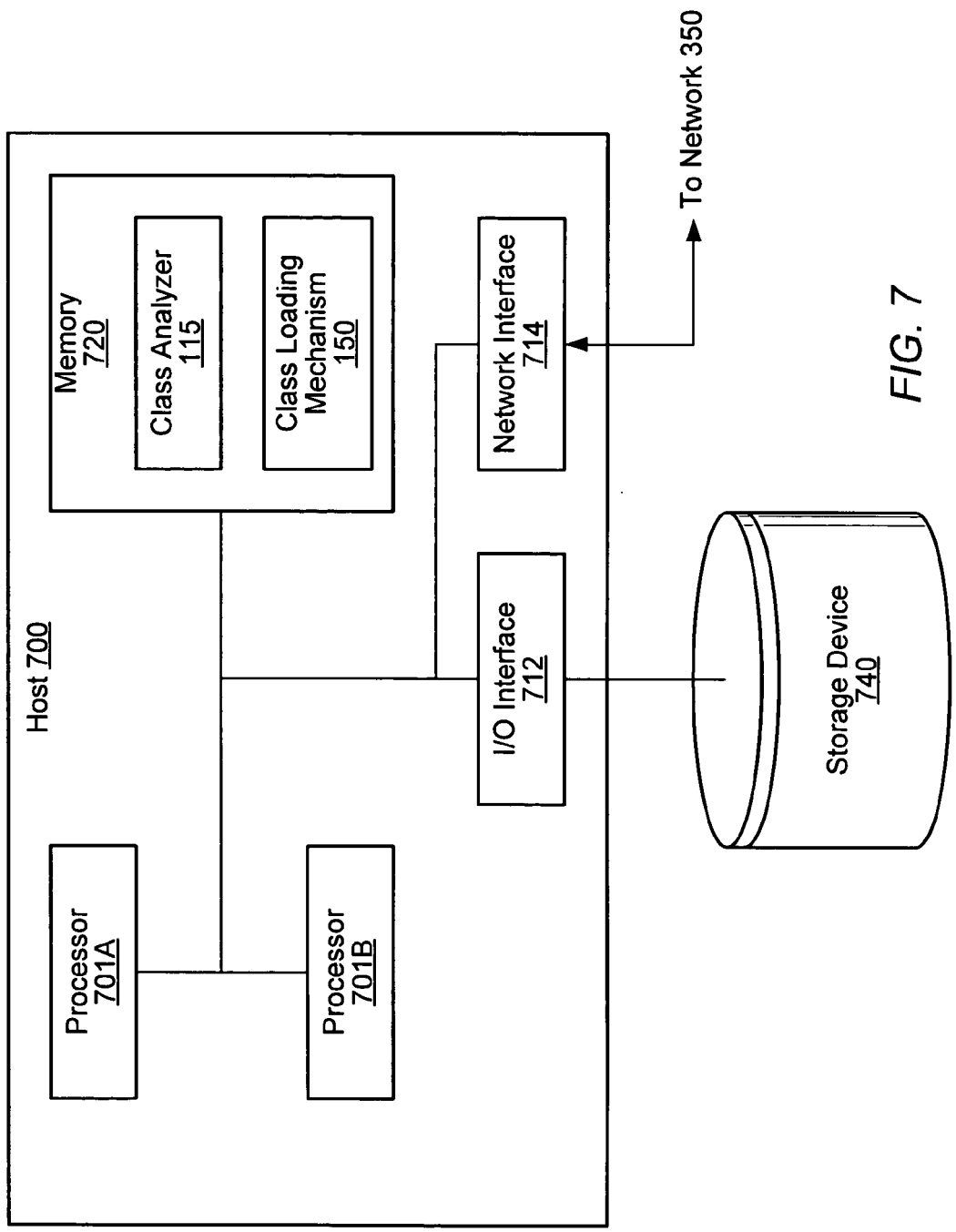
FIG. 7 is a block diagram illustrating constituent elements of a computer host, according to one embodiment While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 7 is a block diagram illustrating constituent elements of a computer host 700, according to one embodiment. Host 700 may include one or more processors 701 implemented using any desired architecture or chip set, such as the SPARC™ architecture from Sun Microsystems or the x86-compatible architectures from Intel Corporation, Advanced Micro Devices, etc. Any desired operating system may be run on the host 700, such as various versions of Solaris™ from Sun Microsystems, Linux, Windows™ from Microsoft Corporation, etc. Program instructions that may be executable to implement the functionality of class analyzer 115 and/or class loading mechanism 150 may be partly or fully resident within a memory 720 at the computer host 700 at any given point in time, and may also be stored on a storage device 740 such as a disk or disk array accessible from the processors. In various embodiments, class analyzer 115 and class loading mechanism 150 may each be packaged as a standalone application, or may be packaged along with an application server or included within a suite of software tools. In some embodiments, the class analyzer 115 may be executed at a host 700 that is managed by a different operating system than one or more other hosts 700 where the class loading mechanism 150 executes. The memory 720 used to store the program instructions may be implemented using any appropriate medium such as any of various types of RAM (e.g., DRAM, SDRAM, RDRAM, SRAM, etc.). In addition to processors and memory, the host 700 may also include one or more I/O interfaces 712 providing access to storage devices 740, and one or more network interfaces 714 providing access to a network such as network 350. Any of a variety of storage devices 740 may be used to store the program instructions as well as application data in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   receiving class metadata including:
      a partitioning of a plurality of classes into a set of class groups based at least in part on one or more dependencies between ones of the plurality of classes;
      for each of the plurality of classes, a respective identifier derived by applying a mathematical function to a definition of the class;
   receiving a request to load a given class of the plurality of classes;
   in response to receiving the request, loading the given class, said loading comprising:
      retrieving a definition of the given class;
      generating an identifier for the retrieved definition by applying the mathematical function to the retrieved definition; and
      validating the retrieved definition of the given class prior to loading the given class for execution, wherein said validating comprises determining that the generated identifier matches the respective identifier of the given class included in the class metadata.

2. The method as recited in claim 1, wherein:
   the metadata comprises respective identifiers for each of the set of class groups, wherein the respective identifiers depend on the identifiers of those of the plurality of classes in the group;
   validating the retrieved definition of the given class is dependent on a group identifier of a group into which the given class is partitioned, the group identifier being indicated by the class metadata.

3. The method as recited in claim 1, further comprising:
   for each class group of the set of class groups, generating a respective class loader to be used to load classes belonging to the class group;
   in response to receiving the request to load the given class, identifying the class loader corresponding the group to which the given class belongs;
   wherein said loading the given class is performed by the identified class loader.

4. The method as recited in claim 1, wherein:
   the metadata comprises respective identifiers for each of the set of class groups, wherein the respective identifier of the group containing the given class depends on the identifiers of those of the plurality of classes in the group and at least in part on an identifier of another of the class groups, wherein the another of the class groups includes at least one class referenced by a class of the class group containing the given class;
   wherein the metadata comprises the group signature.

5. The method as recited in claim 1, further comprising:
   analyzing executable versions of the plurality of classes to identify the one or more dependencies.

6. The method as recited in claim 1, further comprising:
   computing the respective identifiers of the plurality of classes from executable versions of the plurality of classes.

7. The method as recited in claim 1,
   wherein the respective identifier for each class of the plurality of classes, is dependent on one or more interfaces implemented by the class.

8. The method as recited in claim 1, wherein the partitioning is further based at least in part on respective packages to which ones of the plurality of classes belong.

9. The method as recited in claim 1, wherein said retrieving the definition of the given class comprises retrieving a definition corresponding to a class name identified by the request to load the given class.

10. A system, comprising:
   one or more processors; and
   memory coupled to the one or more processors, wherein the memory stores program instructions executable by the one or more processors to:
   receive class metadata including:
      a partitioning of a plurality of classes into a set of class groups based at least in part on one or more dependencies between ones of the plurality of classes;
      for each of the plurality of classes, a respective identifier derived by applying a mathematical function to a definition of the class;

receive a request to load a given class of the plurality of classes;

in response to receiving the request, to load the given class, said loading comprising:

retrieving a definition of the given class;

generating an identifier for the retrieved definition by applying the mathematical function to the retrieved definition; and validating the retrieved definition of the given class prior to loading the given class for execution, wherein said validating comprises determining that the generated identifier matches the respective identifier of the given class included in the class metadata.

11. The system as recited in claim 10, wherein the metadata comprises respective identifier for each of the set of class groups.

12. The system as recited in claim 11, wherein the respective identifier for each of the class groups is dependent the identifiers of one or more of the classes in the class group.

13. The system as recited in claim 12, wherein the respective identifier for a given class group is further dependent at least in part on a respective identifier of another class group, wherein the another class group includes at least one class referenced by a class of the given class group;

wherein the metadata comprises the group signature.

14. The system as recited in claim 10, wherein the instructions are further executable to:

analyze executable versions of the plurality of classes to identify the one or more dependencies.

15. The system as recited in claim 10, wherein said retrieving the definition of the given class comprises retrieving the definition from over a network during runtime.

16. The system as recited in claim 10, wherein the partitioning is dependent on respective packages to which ones of the plurality of classes belong.

17. A system, comprising:

one or more processors; and memory coupled to the one or more processors, wherein the memory stores program instructions executable by the one or more processors to:

receive metadata associated with a plurality of classes, wherein the metadata comprises a partitioning of the plurality of classes into a set of class groups based at least in part on one or more dependencies between the plurality of classes and a respective identifier for each of the plurality of classes, wherein each identifier is derived by applying a mathematical function to a definition of the respective class;

receive a request to load a given class of the plurality of classes;

in response to receiving the request, to load the given class, said loading comprising:

retrieving a definition of the given class;

generating an identifier for the retrieved definition by applying the mathematical function to the retrieved definition; and validating the definition of the given class prior to loading the version for execution, wherein said validating comprises determining that the generated identifier matches the respective identifier of the given class included in the class metadata.

18. The system as recited in claim 17, wherein the instructions are further executable to:

for each class group of the set of class groups, generating a respective class loader to be used to load classes belonging to the class group;

in response to receiving the request to load the given class, identifying the class loader corresponding the group to which the given class belongs;

wherein said loading the given class is performed by the identified class loader.

19. The system as recited in claim 18, wherein the instructions are further executable to:

store a signature corresponding to the respective class loader.

20. The system as recited in claim 17, wherein said retrieving the definition of the given class comprises retrieving the definition from over a network during runtime.

* * * * *